(12) United States Patent
Edgington et al.

(10) Patent No.: US 10,748,143 B2
(45) Date of Patent: Aug. 18, 2020

(54) LOCATION AWARE TRUST-BASED PEER-TO-PEER CURRENCY EXCHANGE

(71) Applicant: International Business Machines Corporation, Armonk, NY (US)

(72) Inventors: Jeff L. Edgington, Keller, TX (US); Kristina E. Jones, Dallas, TX (US); Hung Tack Kwan, Grand Prairie, TX (US); Shiju Mathai, Carrollton, TX (US)

(73) Assignee: International Business Machines Corporation, Armonk, NY (US)

( * ) Notice: Subject to any disclaimer, the term of this patent is extended or adjusted under 35 U.S.C. 154(b) by 823 days.

(21) Appl. No.: 14/945,811

(22) Filed: Nov. 19, 2015

(65) Prior Publication Data

US 2017/0148015 A1    May 25, 2017

(51) Int. Cl.
*G06Q 20/38*    (2012.01)
*G06Q 20/40*    (2012.01)
*G06Q 20/32*    (2012.01)

(52) U.S. Cl.
CPC ....... *G06Q 20/381* (2013.01); *G06Q 20/3224* (2013.01); *G06Q 20/405* (2013.01); *G06Q 20/4016* (2013.01)

(58) Field of Classification Search
CPC .... G06Q 40/04; G06Q 40/06; G06Q 10/1057; G06Q 20/4016; G06Q 20/3223; G06Q 20/381; G06Q 20/405; G06Q 20/3224
See application file for complete search history.

(56) References Cited

U.S. PATENT DOCUMENTS 7,194,481 B1      3/2007 Van Roon
7,747,475 B1 *    6/2010 Bowman .............. G06Q 20/04
                                              705/26.1

(Continued)

FOREIGN PATENT DOCUMENTS

CA         2627540 A1 *  9/2009  ............. G06Q 40/02
WO    WO-2012069256 A1 *  5/2012  ........... G06Q 20/381

OTHER PUBLICATIONS

Phillips, LOz: Peer-to-peer exchange firms cut out banks and brokers: They work by matching buyers and sellers of currencies online, Nov. 17, 2014, Telegraph, pp. 1-3. (Year: 2014).*

(Continued)

*Primary Examiner* — Bijendra K Shrestha
(74) *Attorney, Agent, or Firm* — Aaron N. Pontikos

(57) ABSTRACT

Embodiments of the invention provide for a location aware trust based currency exchange. A method for location aware trust based currency exchange includes receiving in a mobile device on behalf of an end user a request to conduct a peer-to-peer currency exchange transaction. A database is then queried for a listing of partners geographically proximate to a location indicated by the request, the listing including both a trust value for each of the partners indicative of a trustworthiness for a corresponding one of the partners and also an exchange rate offered for each of the partners. The listing is then displayed in the mobile device. Finally, in response to the end user selecting one of the partners in the listing, a message is transmitted to the selected one of the partners indicating a desire by the end user to conduct the peer-to-peer currency exchange transaction.

15 Claims, 2 Drawing Sheets

(56) References Cited

U.S. PATENT DOCUMENTS

| | | | |
|---|---|---|---|
| 8,645,480 B1* | 2/2014 | Emigh | G06Q 30/02 709/206 |
| 8,798,593 B2 | 8/2014 | Haney | |
| 8,856,038 B2 | 10/2014 | Barresse et al. | |
| 9,578,043 B2* | 2/2017 | Mawji | H04L 63/1408 |
| 2002/0152154 A1* | 10/2002 | Rothman | G06Q 30/08 705/37 |
| 2005/0246187 A1* | 11/2005 | Maltzman | G06Q 10/06395 705/7.41 |
| 2009/0012946 A1* | 1/2009 | Tsunokawa | H04N 7/173 |
| 2009/0213133 A1* | 8/2009 | Kawamura | G06F 16/904 345/589 |
| 2009/0248574 A1* | 10/2009 | Leung | G06Q 20/10 705/39 |
| 2009/0248602 A1* | 10/2009 | Frazier | G06Q 30/02 706/46 |
| 2011/0137789 A1* | 6/2011 | Kortina | G06Q 20/405 705/38 |
| 2013/0080197 A1* | 3/2013 | Kung | G06Q 10/10 705/7.11 |
| 2013/0110732 A1* | 5/2013 | Uppal | G06Q 10/0635 705/319 |
| 2013/0166374 A1* | 6/2013 | Capuozzo | G06Q 30/0276 705/14.43 |
| 2014/0316940 A1 | 10/2014 | Kirchenbauer et al. | |
| 2015/0026031 A1 | 1/2015 | Mullin, III | |
| 2015/0058950 A1* | 2/2015 | Miu | H04L 63/105 726/7 |
| 2015/0100460 A1* | 4/2015 | Howden | G06Q 30/0609 705/26.35 |
| 2016/0005033 A1* | 1/2016 | Flick von Zitzewitz | G06Q 40/04 705/39 |
| 2016/0353245 A1* | 12/2016 | Kulikov | G06Q 30/02 |

OTHER PUBLICATIONS

Bater, Emily: Peer-to-peer currency exchange, Jul. 5, 2015, Internet Archives, Gocompare.com, pp. 1-2. (Year: 2015).*

"Weelo.com", downloaded from the Internet on Mar. 22, 2020, 1 page, <http://www.weeleo.com/en/>.

Kreft, Heinz, "Wallet Based E-Cash System for Secured Multi-hop Cash Exchange", International Conference on Information and Communication Technologies from Theory to Applications—ICTTA'08, Apr. 2008, ISBN: 9781424417513, 6 pages.

* cited by examiner

LOCATION AWARE TRUST-BASED PEER-TO-PEER CURRENCY EXCHANGE

BACKGROUND OF THE INVENTION

Field of the Invention

The present invention relates to location based services management and more particularly to location based currency exchange services management.

Description of the Related Art

Currency is a generally accepted form of money, including coins and paper notes, which is issued by a government and circulated within an economy. Used as a medium of exchange for goods and services, currency is the basis for trade. In finance, a currency exchange rate between two currencies, also known as a foreign exchange rate, is the rate at which one currency will be exchanged for another. The currency exchange rate is also regarded as the value the currency of one country in terms of the value of currency of another country.

A currency exchange is a business enterprise in which the exchange of currency is facilitated on behalf of a buyer of the currency and the seller of the currency. Oftentimes a service offered by a bank or financial institution, currency exchange also may form the basis of a stand-alone business enterprise. In a currency exchange service, the currency exchange profits from its services either through adjusting of the exchange rate or the taking of a commission. Thus, the conduct of a currency exchange is highly dependent upon the knowledge by all participants to a currency exchange transaction of the current market to buy and sell a currency of one country in respect to the currency of another country.

With the advent of the Internet, the information requisite to an efficient currency exchange transaction has become widely available in real time giving rise to several currency exchange tools. The ubiquity of mobile computing has only enhanced the ability of the different parties to a currency exchange transaction to accurately engage in currency exchange. Popular mobile applications permit both offline and online computation of currency exchange rates. As well some mobile applications permit online currency trading through globally established foreign exchange marketplaces. In all circumstances, the administrative cost of conducting a currency exchange transaction can be high. Consequently, many prefer to conduct small currency exchange transactions outside of established currency exchanges and globally established foreign exchange marketplaces.

In this regard, in many locales, smallish currency exchange transactions with minimal administrative fees occur daily, such as through hotel reception desks, local retail merchants, restaurants and even amongst individuals in the street. Armed with access to the Internet, then, two peer participants to a currency exchange transaction can simply determine an appropriate exchange rate manually and perform the transaction utilizing the determined rate and without very high transaction fees. Obviously, some risk exists with respect to the trustworthiness of a local currency exchange partner in a foreign jurisdiction. To help address some of the safety concerns in respect to small peer-to-peer currency transactions, at least one mobile application combines an online travel advice forum with peer matching in a specified location in order to provide a peer-to-peer currency exchange platform with minimal to no transaction fees.

BRIEF SUMMARY OF THE INVENTION

Embodiments of the present invention address deficiencies of the art in respect to peer-to-peer currency exchange methodologies and provide a novel and non-obvious method, system and computer program product for a location aware trust based currency exchange. In an embodiment of the invention, a method for location aware trust based currency exchange includes generating in a mobile device on behalf of an end user a request to conduct a peer-to-peer currency exchange transaction. The request specifies an amount of currency and both a source and target currency and a location of the mobile device. Thereafter, a database is queried for a listing of partners geographically proximate to the location indicated by the request. The listing itself includes both a trust value for each of the partners indicative of a trustworthiness for a corresponding one of the partners and also an exchange rate offered for each of the partners. Subsequently, the listing is displayed in the mobile device. Finally, in response to the end user selecting one of the partners in the listing, a message is transmitted to the selected one of the partners indicating a desire by the end user to conduct the peer-to-peer currency exchange transaction.

In one aspect of the embodiment, the listing is filtered according to a minimum threshold value of trustworthiness for each of the partners. In another aspect of the embodiment, the listing is filtered according to a maximum threshold geographic distance from the location of the mobile device. In yet another aspect of the embodiment, the listing is sorted according to exchange rate. In even yet another aspect of the embodiment, the trust value for each of the partners is computed at least in part on negative information published in one or more Web site and discovered through Web crawling. In this regard, the content of different Web sites can be parsed to identify references to each of the partners utilizing terminology associated with negative information and depending upon the terminology identified within a Web site for a corresponding one of the partners, an adjustment to the trust value can be applied.

In another embodiment of the invention, a mobile data processing system is configured for location aware trust based currency exchange. The system can be entirely encased within a mobile device for pure peer-to-peer interactions with other mobile devices, or the system can serve as a third party intermediary to different mobile devices. In the latter instance, the system includes a host computing system that includes one or more computers, each with memory and at least one processor. The system also includes a database of currency exchange transaction partners. The database includes a multiplicity of records each record corresponding to a currency exchange transaction partner, a geographic location of the currency exchange transaction partner, a currency, a corresponding offered exchange rate, and a trust value. Finally, the system includes a currency exchange computer program executing in the memory of the host computing system.

The program itself includes program instructions enabled to receive from a communicatively coupled mobile device on behalf of an end user a request to conduct a peer-to-peer currency exchange transaction, the request specifying an amount of currency and both a source and target currency and a location of the mobile device. The program instructions are also enabled to query the database for a listing of partners geographically proximate to the location indicated by the request, the listing comprising both a trust value for each of the partners indicative of a trustworthiness for a corresponding one of the partners and also an exchange rate offered for each of the partners. The program instructions are yet further enabled to transmit the listing to the mobile device. Finally, the program instructions are enabled to respond to the end user selecting one of the partners in the listing by transmitting a message to the selected one of the partners indicating a desire by the end user to conduct the peer-to-peer currency exchange transaction.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Embodiments of the invention provide for location aware trust based currency exchange. In accordance with an embodiment of the invention, a request is received from an end user in a user interface to a currency exchange mobile application to conduct a currency exchange transaction of a specified value in a source currency and a target currency. A geographic location is determined for the end user based upon the request and a database is queried to locate a listing of available transaction partners. The listing is filtered based upon criteria associated with the end user such as trust criteria, or distance criteria, or exchange rate criteria, and the filtered listing is presented in the user interface. Thereafter, in response to a selection of a particular one of the partners in the listing, a message is transmitted to a mobile device of the particular one of the partners indicating an interest in conducting the currency exchange. In this way, a peer-to-peer currency exchange transaction is facilitated in consideration both of the location of the end user and also a degree of trust for the target partner to the currency exchange transaction.

Figure 1:
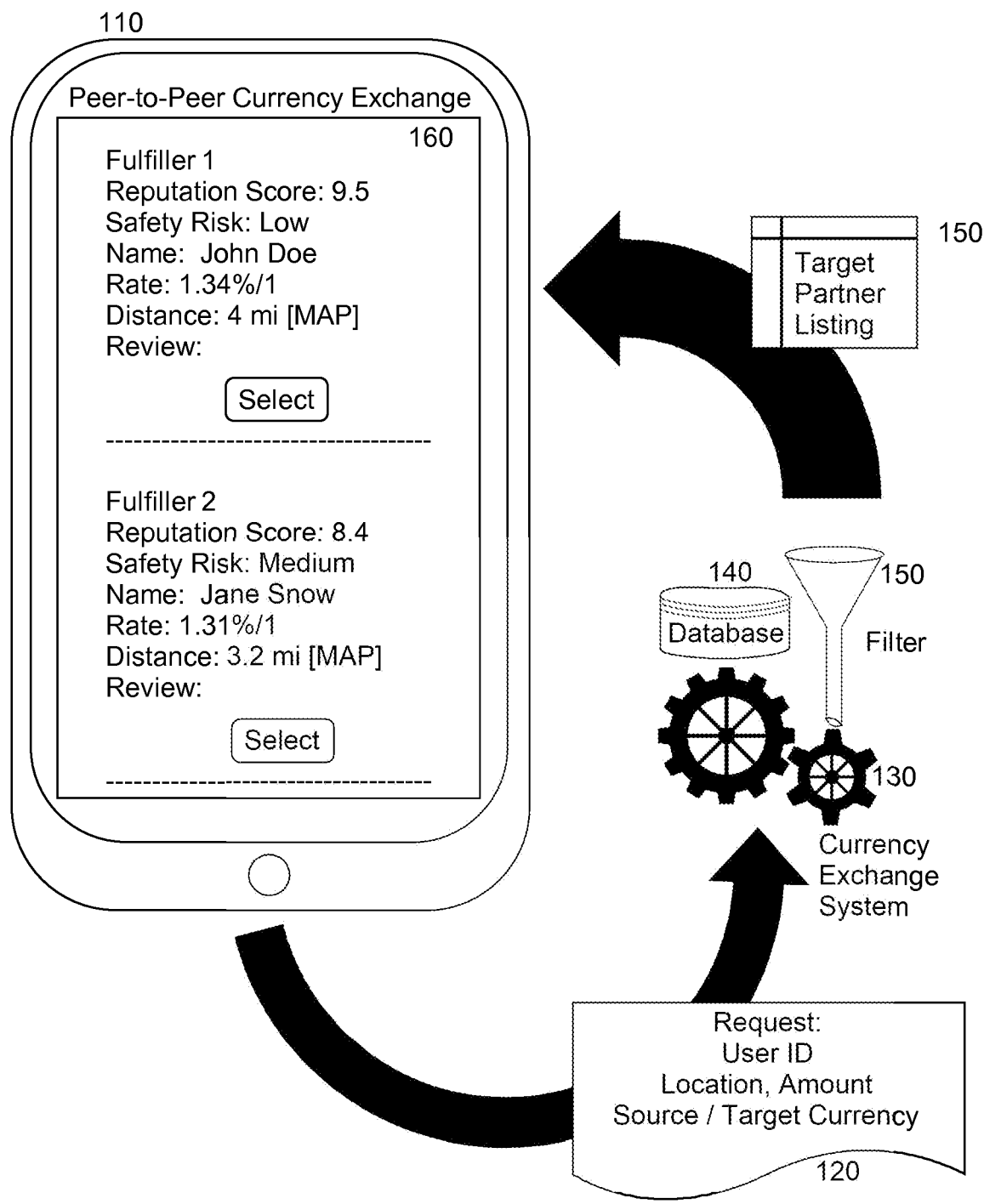
FIG. 1 is a pictorial illustration of a process for location aware trust based currency exchange.

In further illustration, FIG. 1 pictorially shows a process for location aware trust based currency exchange. As shown in FIG. 1, a currency exchange request 120 can be generated within a mobile device 110 of an end user and provided to a currency exchange system 130 disposed remotely in a separate computing device, or locally within the mobile device 110. The request 120 can specify an identity of the end user, a contemporaneous location of the mobile device 110, an amount of currency to be exchanged, and a source and target currency. The currency exchange system 130 then queries a database 140, also disposed either locally within the mobile device 110, or remotely in a separate computing device, to locate different partners able to exchange the amount of currency of the request 120 within geographic proximity of the mobile device 110. The located partners are placed into a listing that is subjected to a filter 150.

The filter 150 can restrict the partners in the listing based upon different criteria such as a maximum distance from the mobile device 110 of each of the partners in the listing, a minimum rating associated with each of the partners in the listing, or a threshold exchange rate offered by each of the partners in the listing. With respect to the minimum rating, each of the partners in the database 140 can include one or more rated values, such as a reputation score or safety risk score. Both can be sourced for each partner in the database 140 based upon prior feedback presented by prior end users having engaged in currency exchange transactions with the corresponding partner.

In any event, after the filtered form of the listing 150 is generated, the filtered form of the listing 150 is displayed in the mobile device 110 as a list 160. The list 160 includes a selection of partners having met the filter 150 and an option for selecting one of the partners in the list 160. The list 160 can be sorted according to a reputation score, safety risk, distance from the mobile device 110 or exchange rate, to name a few examples. Once one of the partners in the list is selected, the currency exchange system 130 responds to the selection by transmitting a message to the selected partner inviting the selected partner and the end user to directly communicate in order to consummate the requested currency exchange transaction.

Figure 2:
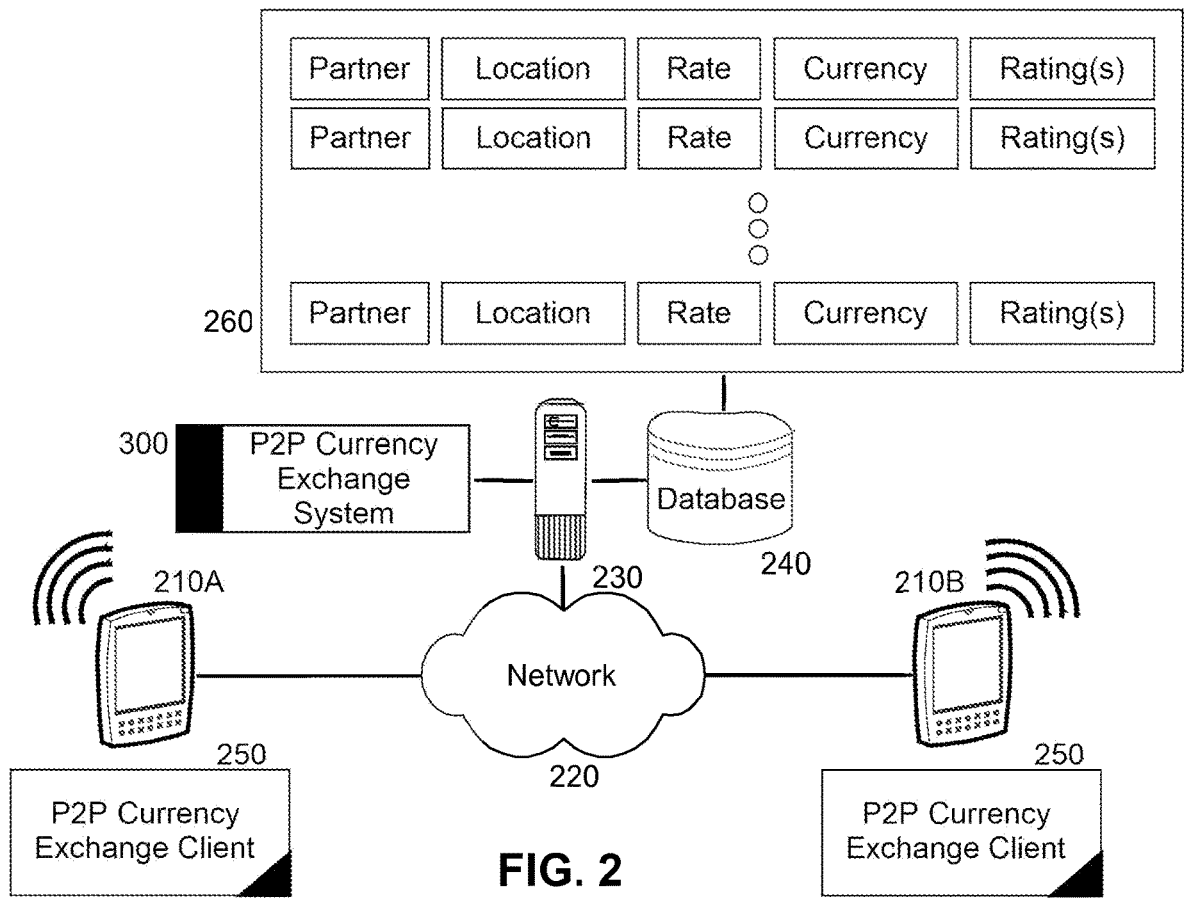
FIG. 2 is a schematic illustration of a mobile data processing system configured for location aware trust based currency exchange; and, FIG. 3 is a flow chart illustrating a process for location aware trust based currency exchange.

In one aspect of the invention, the process described in connection with FIG. 1 may be implemented in a data processing system acting as a third party intermediary amongst different mobile devices. In further illustration, FIG. 2 schematically shows a mobile data processing system configured for location aware trust based currency exchange. The system includes a host computing system 230 that includes one or more computers, each with memory and at least one processor. The host computing system 230 is coupled to different mobile computing devices 210A, 210B over computer communications network 220. The host computing system 230 supports the execution of a peer-to-peer currency exchange system 300 communicating over the computer communications network 220 with peer-to-peer currency exchange clients 250 in respective ones of the mobile computing devices 210A, 210B.

A database 240 also is coupled to the host computing system 230. The database 240 includes different records 260, each for a different currency exchange partner. Each of the records 260 includes a field identifying a particular partner, a contemporaneous geographic location of the corresponding partner, a contemporaneously offered exchange rate for exchanging currency from a source to a target currency also specified within the record, and one or more ratings such as a safety risk or a reputation score. The records 260 of the database 240 are periodically updated to reflect not only a contemporaneously determined geographic location of a corresponding one of the partners, but also a most recently supplied exchange rate for the corresponding one of the partners, and a most recently computed rating supplied by others interacting with the corresponding one of the partners, or automatically determined by crawling third party Web sites in which negative or positive content pertaining to the corresponding one of the partners is found, or both.

The peer-to-peer currency exchange system 300 is comprised of program code that when executed by one or more processors of the host computing system 230, is enabled to receive a request for currency exchange from a user interface of the peer-to-peer currency exchange client 250 in the mobile computing device 210A specifying a desired value of source currency to be exchanged into target currency, as well as a contemporaneous geographic location of the mobile computing device 210A. The program code also is enabled thereafter to query the database 240 for one or more partners able to perform a currency exchange transaction on the basis of the terms specified within the request.

The program code yet further is enabled to filter the partners based upon one or more filtering criteria such as a maximum distance of a corresponding one of the partners from the geographic location of the mobile computing device 210A, a threshold exchange rate provided by a corresponding one of the partners, or a minimum rating associated with the corresponding one of the partners. The program code even yet further is enabled to transmit the filtered listing of the partners to the peer-to-peer currency exchange client 250 of the mobile computing device 210A and then respond to a selection therein of one of the partners by transmitting a message to a peer-to-peer currency exchange client 250 in a different mobile computing device 210B indicating a preference by the end user to engage in the requested currency exchange transaction.

Figure 3:
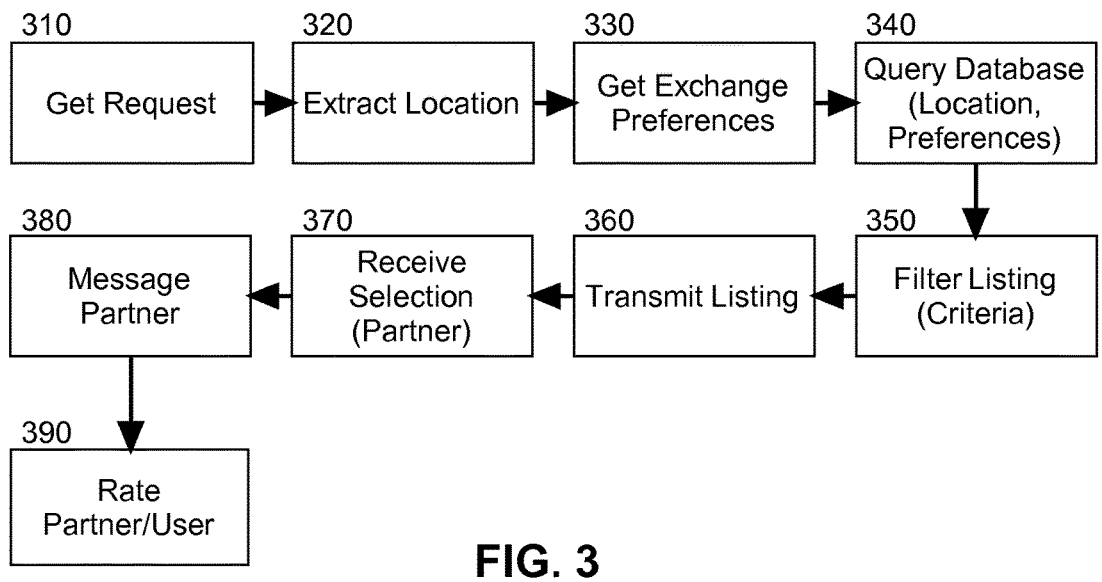

In even yet further illustration of the operation of a peer-to-peer exchange system disposed either locally within a mobile device, or remotely in an intermediary computing system, FIG. 3 is a flow chart illustrating a process for location aware trust based currency exchange. Beginning in block 310, a request is received from an end user to conduct a currency exchange transaction. In block 320, a contemporaneous geographic position of the end user is determined based upon location data present in the request. In block 330, currency exchange preferences also are extracted from the request, such as an amount of currency to be exchanged, and a source and target currency from which and to which the exchange is to occur.

In block 340, a database of currency exchange partners is queried to produce a listing of different partners without geographic proximity of the end user and able to conduct the currency exchange on a basis indicated by the currency exchange preferences. In block 350, the listing is filtered according to one or more filtering criteria, such as a maximum geographic distance separating each partner in the listing from the end user, a threshold exchange rate offered by each partner in the listing, or a minimum rating or ratings associated with each partner in the listing.

Thereafter, the filtered form of the listing is displayed to the end user in a user interface to a peer-to-peer currency exchange client. In block 370, a selection of one of the partners in the filtered listing is received from the end user and in block 380, a message is transmitted to the selected partner to initiate communications between the selected partner and the end user. Finally, subsequent to a consummation of the requested currency exchange, a rating can be received from the partner in respect to the end user, and also from the end user in respect to the partner as to the safety risk or reputation of the other for storage in the database 240.

The present invention may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims as follows:

The invention claimed is:

1. A method for location aware trust based currency exchange, the method comprising:
    recording in a database different exchange rates offered by different partners for different transactions conducted by the different partners in a peer-to-peer currency exchange;
    receiving in a mobile device on behalf of an end user a request to conduct a peer-to-peer currency exchange transaction, the request specifying an amount of currency and both a source and target currency and a location of the mobile device;
    querying the database for a listing of the different partners that are geographically proximate to the location indicated by the request, the listing comprising each of a trust value and a safety risk score for each of the partners indicative, respectively, of a trustworthiness for a corresponding one of the partners computed by modifying negatively an existing trust value for the corresponding one of the partners after parsing content in published Web sites and locating in the Web sites in consequence of the parsing, negative terminology associated with the corresponding one of the partners, and a safety risk in engaging in a currency exchange transaction with the corresponding one of the partners, and also an exchange rate most recently offered by each of the partners;
    displaying the listing in the mobile device; and,
    responsive to the end user selecting one of the partners in the listing, transmitting a message to the selected one of the partners indicating a desire by the end user to conduct the peer-to-peer currency exchange transaction.

2. The method of claim 1, wherein the listing is filtered according to a minimum threshold value of trustworthiness for each of the partners.

3. The method of claim 1, wherein the listing is filtered according to a maximum threshold geographic distance from the location of the mobile device.

4. The method of claim 1, wherein the listing is sorted according to exchange rate.

5. The method of claim 1, wherein the trust value for each of the partners is computed at least in part on negative information published in one or more Web site and discovered through Web crawling.

6. A mobile data processing system configured for location aware trust based currency exchange, the system comprising:

a host computing system comprising one or more computers, each with memory and at least one processor;

a database of currency exchange transaction partners, the database comprising a multiplicity of records each record corresponding to a currency exchange transaction partner, a geographic location of the currency exchange transaction partner, a currency, a corresponding offered exchange rate, and a trust value; and, a currency exchange computer program executing in the memory of the host computing system, the program comprising program instructions enabled to:

record in the database different exchange rates offered by the currency exchange transaction partners for different transactions previously conducted by the partners;

receive from a communicatively coupled mobile device on behalf of an end user a request to conduct a peer-to-peer currency exchange transaction, the request specifying an amount of currency and both a source and target currency and a location of the mobile device;

query a database for a listing of the partners that are geographically proximate to the location indicated by the request, the listing comprising each of a trust value computed by modifying negatively an existing trust value for the corresponding one of the partners after parsing content in published Web sites and locating in the Web sites in consequence of the parsing, negative terminology associated with the corresponding one of the partners, and a safety risk score for each of the partners indicative, respectively, of a trustworthiness for a corresponding one of the partners and a safety risk in engaging in a currency exchange transaction with the corresponding one of the partners, and also an exchange rate most recently offered by each of the partners;

transmit the listing to the mobile device; and, respond to the end user selecting one of the partners in the listing by transmitting a message to the selected one of the partners indicating a desire by the end user to conduct the peer-to-peer currency exchange transaction.

7. The system of claim 6, wherein the listing is filtered according to a minimum threshold value of trustworthiness for each of the partners.

8. The system of claim 6, wherein the listing is filtered according to a maximum threshold geographic distance from the location of the mobile device.

9. The system of claim 6, wherein the listing is sorted according to exchange rate.

10. The system of claim 6, wherein the trust value for each of the partners is computed at least in part on negative information published in one or more Web site and discovered through Web crawling.

11. A computer program product for location aware trust based currency exchange, the computer program product comprising a non-transitory computer readable storage medium having program instructions embodied therewith, the program instructions executable by a device to cause the device to perform a method comprising:

recording in a database different exchange rates offered by different partners for different transactions conducted by the different partners in a peer-to-peer currency exchange;

receiving in a mobile device on behalf of an end user a request to conduct a peer-to-peer currency exchange transaction, the request specifying an amount of currency and both a source and target currency and a location of the mobile device;

querying the database for a listing of the different partners that are geographically proximate to the location indicated by the request, the listing comprising each of a trust value computed by modifying negatively an existing trust value for the corresponding one of the partners after parsing content in published Web sites and locating in the Web sites in consequence of the parsing, negative terminology associated with the corresponding one of the partners, and a safety risk score for each of the partners indicative, respectively, of a trustworthiness for a corresponding one of the partners and a safety risk in engaging in a currency exchange transaction with the corresponding one of the partners, and also an exchange rate most recently offered by each of the partners;

displaying the listing in the mobile device; and, responsive to the end user selecting one of the partners in the listing, transmitting a message to the selected one of the partners indicating a desire by the end user to conduct the peer-to-peer currency exchange transaction.

12. The computer program product of claim 11, wherein the listing is filtered according to a minimum threshold value of trustworthiness for each of the partners.

13. The computer program product of claim 11, wherein the listing is filtered according to a maximum threshold geographic distance from the location of the mobile device.

14. The computer program product of claim 11, wherein the listing is sorted according to exchange rate.

15. The computer program product of claim 11, wherein the trust value for each of the partners is computed at least in part on negative information published in one or more Web site and discovered through Web crawling.

* * * * *